Jan. 28, 1958   A. L. RUCK ET AL   2,820,975
BINDER OPERATING MACHINE
Filed Oct. 5, 1955
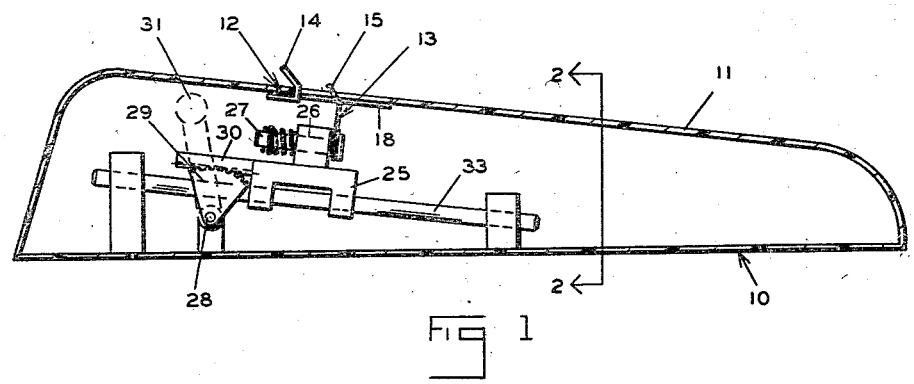
Fig. 1
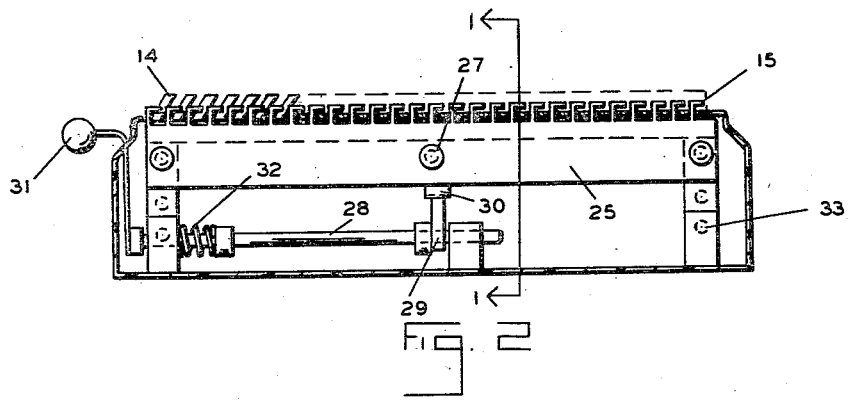
Fig. 2
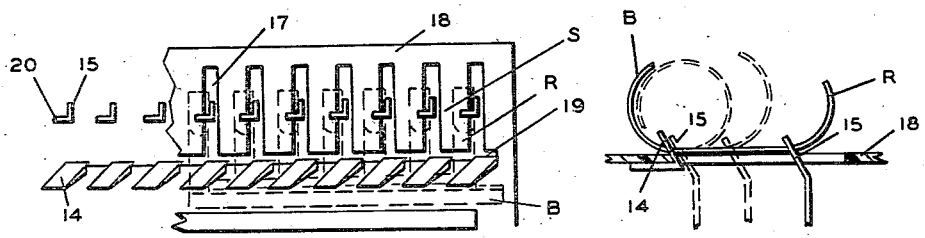
Fig. 3
Fig. 4
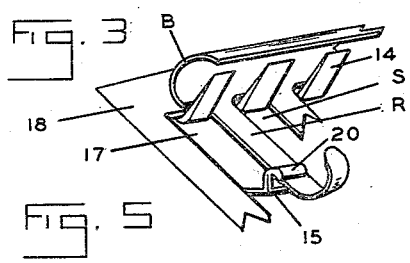
Fig. 5
*INVENTORS.*
ARTHUR L. RUCK
RICHARD C. LAYNE
BY RALPH E. DENNIS
CORBETT, MAHONEY & MILLER,
ATTYS.
BY *Wm. V. Miller*

2,820,975
BINDER OPERATING MACHINE

Arthur L. Ruck, Richard C. Layne, and Ralph E. Dennis, Columbus, Ohio

Application October 5, 1955, Serial No. 538,725

12 Claims. (Cl. 11—1)

Our invention relates to a binder operating machine. It has to do, more particularly, with a machine for operating a binder of the type which is made of thermoplastic material and which consists of a longitudinally extending back-bone of semi-circular form having binder rings extending from one edge thereof around into meeting or overlapping relationship to the other edge thereof. This type of binder is commonly in use as a loose-leaf binder and is disclosed in the patent to Douvry, No. 1,970,285 issued August 14, 1934.

A binder of the type indicated is of such a nature that the rings thereof tend to stay in operative position where the free ends of the rings meet or overlap the backbone. However, the thermoplastic material has sufficient elasticity so that the free ends of the rings can be bent away from the backbone to permit the assembly or removal of properly punched loose-leaf sheets in relationship to the binder. However, in assembling or removing the sheets, it is necessary to provide a tool or machine which will hold the backbone and spread the rings relative thereto. The present invention relates to a machine for operating a binder of this type in this manner.

There have been various binder operating machines designed for spreading the rings relative to the backbone. All of these machines with which we are familiar employ hooks which are inserted in the rings and are then moved in a proper direction to pull the rings in order to spread them. In actuating the hooks with this type of machine, two distinct movements are necessary, namely, a movement axially of the rings to insert the hooks into the rings and a movement at right angles to the first movement so that the hooks will engage the rings and spread them or, in other words, pull the free ends of the rings away from the backbone. These two distinct movements of the hooks are usually accomplished with a slide movable in one direction, a slide movable at right angles thereto, and actuating mechanism for accomplishing such movements.

It is the object of our invention to provide a binder operating machine which is extremely simple, in which the rings are opened by pusher members in such a manner that the plastic material thereof will not be injured, in which the pusher members are properly located axially within the binder rings merely by the operator positioning the binder on the machine, and in which one movement only of the pusher members is subsequently required to spread the rings.

According to our invention, we provide an arrangement whereby the operator is merely required to position the plastic binder on the machine and this operation, in itself, will properly position the binder rings relative to the pusher members so that the pusher members will be within the rings ready for the ring-spreading operation. This is accomplished by providing a binder supporting comb-unit and a ring-spreading pusher comb-unit which are so designed and arranged relatively that in slipping the binder on the supporting comb structure it is moved bodily axially so that the rings thereof slip over the pusher members of the pusher comb-unit. Then it is merely necessary to move the binder supporting comb-unit and the pusher comb-unit relatively in one direction only, that is, at right angles to the axis of the binder, to spread and open the binder rings.

In the accompanying drawing we have illustrated our machine but it may take other forms without departing from the basic principles of our invention. In these drawings:

Figure 1 is a vertical sectional view taken forwardly and rearwardly through a machine constructed according to our invention along line 1—1 of Figure 2.

Figure 2 is a vertical sectional view taken at right angles to that of Figure 1 along line 2—2 of Figure 1.

Figure 3 is a diagrammatic view in plan illustrating the positioning of the plastic binder on the supporting comb and its resultant movement longitudinally to position the binder rings over the pusher members.

Figure 4 is a diagrammatic view in side elevation illustrating the movement of a pusher member in opening one of the plastic rings of the binder.

Figure 5 is a perspective view showing the ring-spreading operation.

With reference to the drawing, we have illustrated our machine as comprising a housing or casnig 10 which has an upper wall 11 that is downwardly and forwardly inclined. The general arrangement is illustrated best in Figures 1 and 2.

As indicated in the drawing, towards the upper end of the upper wall 11 we provide a binder supporting comb-unit 12 and an associated ring-spreading pusher comb-unit 13. The unit 13 is movable towards and away from the fixed unit 12 or, in other words, is movable at right angles to the axis of the plastic binder which will be supported by the unit 12, as indicated in Figures 3 to 5, inclusive.

The supporting comb-unit 12 comprises a series of upstanding supporting fingers 14, each of which is directed both rearwardly and laterally to the right (Figures 1, 4 and 5) at an angle. Each of the spaces between adjacent fingers 14 is of a width corresponding substantially to the width of the rings R of the plastic binder to be supported on the machine. The width of each of these fingers 14 corresponds substantially to the width of each space S between the adjacent rings R of the binder as indicated diagrammatically in Figure 3. The binder is adapted to be slipped over the fingers 14 so that the fingers will engage the backbone B and hold the binder in a fixed position on the upper part of the wall 11, as shown in Figures 3 to 5.

The pusher comb-unit 13 comprises the pusher members 15 which extend upwardly and rearwardly relative to the plate 11. The upper ends of these members 15 are of inverted L-shape and extend upwardly through forwardly and rearwardly directed slots 17 (Figure 3) formed in a plate 18 mounted on the plate 11. These slots 17 are parallel and extend at right angles to a transverse slot 19 formed along the upper edge of the plate 18. The fingers 14 of the supporting comb-unit 12 project up through this slot and the body of this comb-unit is connected to the undersurface of the plate 11 rearwardly of the slot 19 as shown in Figure 1. The extreme upper ends of the pusher members 15 are provided with laterally directed pusher elements 20 which are about half, in lateral extent, the width of the rings R or the width of the space between adjacent fingers 14 as shown in Figure 3. It will be noted that the fingers 14 (Figure 4) are very short relative to the diameter of the rings R of the binder, being less than one-half the diameter of the rings of the smallest binder to be supported on the machine. In the initial position of the combs 12 and 13, the rearwardly bent upper ends of the pusher members 15 lie back against the rearwardly and laterally directed supporting fingers 14 as shown in dotted line position in Figure 4.

The angle of the supporting fingers 14 relative to the plate 18 and the pusher members 15 is important and this angle laterally must be sufficient to guide the binder longitudinally, as the operator slips it over the fingers 14, so that the rings R of the binder will slip angularly over the pusher elements 20. As shown in Figure 3, the angle of the fingers 14 is such that as the binder is slipped thereon, the fingers will engage the sides of the rings and act as cams to guide the binder bodily axially so that the rings R will slip over the pusher elements 20. As shown in Figure 3, each pusher element 20 is of substantially the same lateral extent as the width of the associated finger 14 and is in alignment with the side edges of the fingers 14 at the upper extremities thereof. The result is that as the binder rings R slip down between the fingers 14 they are cammed laterally to an extent equal to the length of the pusher elements 20 which is the same as the width of the fingers 14. The result is that the pusher elements 20 will now be within the rings R as shown in Figure 3. Now it is merely necessary to move the pusher members 15 forwardly away from the supporting fingers 14 in the manner shown in Figures 3 and 4. This will roll out each ring R on the plate 18 as illustrated in Figures 4 and 5.

In order to move the pusher members 15 to spread the rings R a simple supporting carriage 25 is provided for the pusher comb-unit 13 as shown in Figures 1 and 2. The unit 13 is connected to an upstanding part 26 of the carriage by spring plunger units 27 which will permit slight forward yielding of the comb-unit 13 to insure that when the carriage 25 is returned to its original position, the pusher elements 20 of the pusher members 15 will be in flat contact with the supporting fingers 14, as shown in the initial position indicated in Figure 4.

The carriage 25 is mounted for forward and rearward sliding movement on inclined guide rods 33 so that it will move parallel to the top plate 11 of the casing. For moving the carriage a transverse rock shaft 28 is mounted in the casing 10 and carries a gear segment 29 which meshes with a rack 30 provided on the carriage. The shaft 28 is rocked by a handle 31 extending upwardly from the casing and a torsion spring 32 is provided on the shaft for normally keeping the carriage 25 in its original position where pusher elements 20 will contact the binder supporting fingers 14.

It will be apparent from the above, that merely positioning the binder on the supporting comb 12 by the operator will locate the pusher elements 20 in the rings R properly for the subsequent spreading operation. This spreading is then accomplished by movement of the handle 31 which will produce a simple forward movement of the carriage 25 and the ring-pusher elements 20 which it carries.

It will be apparent from the above description that we have provided a machine for actuating a binder and that this machine is very simple and inexpensive, yet very effective for its purpose. The machine is so designed that it is merely necessary to provide mechanism for accomplishing one movement only of the pusher members relative to the supporting fingers since the operator positions the rings over the pusher members by initially mounting the binder on the machine. Thus, the mechanism of the machine is greatly simplified and yet no complicated manipulations are required by the operator, since he merely has to position the binder on the machine and move the operating handle in one direction, as with the more complicated and expensive prior art machines.

Various other advantages will be apparent.

Having thus described our invention, what we claim is:

1. A machine for actuating a binder of the type which includes flexible split rings adapted to be spread to permit insertion or removal of punched loose-leaf elements comprising a unit for supporting the binder, a ring engaging unit adjacent said supporting unit, said supporting unit comprising fingers which extend angularly so that as the binder rings are moved therebetween the binder will be guided longitudinally into cooperative relationship with said ring engaging unit.

2. A machine according to claim 1 wherein said ring engaging unit comprises fingers which have laterally-directed portions over which the rings are guided upon longitudinal movement of the binder.

3. A machine according to claim 2 wherein said supporting fingers extend upwardly and laterally at an angle and said ring engaging fingers are moved forwardly away therefrom to spread the rings.

4. A machine according to claim 3 wherein the laterally-extending portions of the ring engaging fingers are of the same extent laterally as the width of the supporting fingers.

5. A machine according to claim 4 wherein said supporting fingers are angled laterally to substantially the same extent as the lateral extent of said laterally extending portions of said ring engaging fingers.

6. A machine according to claim 5 wherein said laterally-extending portions are in contact with and in alignment with said supporting fingers when the binder is positioned thereon.

7. A machine according to claim 1 in which the first unit comprises hook-shaped ring engaging members and the second unit comprises similar members in alignment with the first members and in contact therewith, said relative movement spreading said members to spread said ring.

8. A machine for actuating a binder of the type which includes a backbone that carries flexible split rings adapted to be spread from the backbone to permit insertion or removal of punched loose-leaf elements, comprising a supporting comb for the binder, said supporting comb comprising fingers which extend upwardly and rearwardly as well as laterally so that when the binder is positioned thereon it will be moved bodily axially, a ring spreading comb-unit, said ring spreading comb-unit including spreading fingers which have laterally extending ring engaging upper ends which are adapted to engage and spread the rings, said laterally extending ends being closely adjacent said supporting fingers at the upper ends thereof in their initial positions so that as the binder is positioned on the supporting unit and is moved axially by the angular fingers thereof the rings move over said laterally-extending ends of the spreading fingers, and means for moving said spreading fingers forwardly away from said supporting fingers to spread the binder rings.

9. A machine according to claim 8 wherein the laterally extending ends of the ring spreading fingers are of the same extent as the width of the supporting fingers and wherein said supporting fingers are angled laterally to an extent substantially the same as the lateral extent of said laterally extending finger ends.

10. A machine according to claim 9 wherein said supporting fingers extend upwardly a distance less than the radius of the rings of the smallest binder to be mounted on the machine.

11. A machine according to claim 9 wherein said binder ring spreading fingers are mounted on a carriage, means for moving said carriage forwardly to move said ring spreading fingers away from said supporting fingers, means for returning said carriage rearwardly to its initial position, said ring spreading fingers being flexibly mounted on said carriage to insure that they will contact with the supporting fingers when the carriage is returned rearwardly to its initial position.

12. A machine for actuating a binder of the type which includes flexible split rings adapted to be spread to permit insertion or removal of punched loose-leaf elements comprising a unit for supporting the binder, a ring-engaging unit adjacent said supporting unit, said supporting unit comprising fingers which extend laterally relative to the ring-engaging unit so that as the binder is positioned on the supporting unit and the binder rings are moved therebetween the binder will be guided longitudinally into cooperative relationship with said ring-engaging unit.

References Cited in the file of this patent

UNITED STATES PATENTS

| | | |
|---|---|---|
| 2,257,714 | Emmer | Sept. 30, 1941 |
| 2,603,801 | Emmer | July 22, 1952 |